J. H. SMITH.
RETREADING MOLD.
APPLICATION FILED AUG. 15, 1918.
1,358,888.
Patented Nov. 16, 1920.
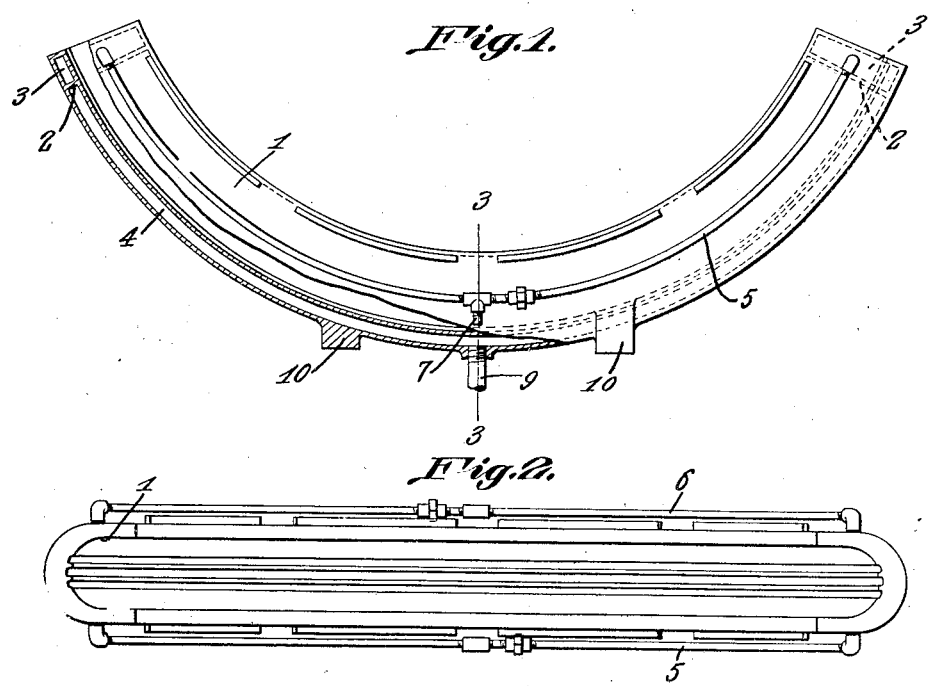
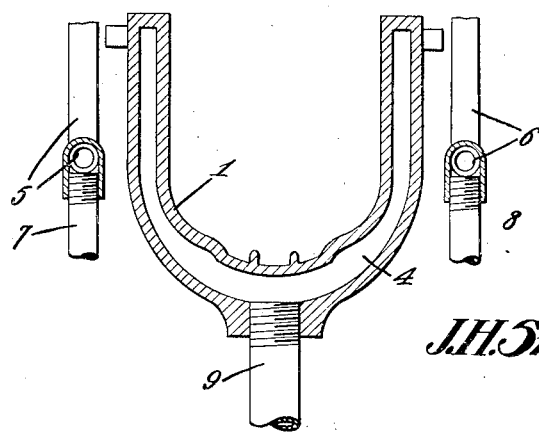
J. H. Smith, Inventor

UNITED STATES PATENT OFFICE.

JAY HARLEY SMITH, OF SAN FRANCISCO, CALIFORNIA.

RETREADING-MOLD.

1,358,888. Specification of Letters Patent. Patented Nov. 16, 1920.

Application filed August 15, 1918. Serial No. 250,000.

*To all whom it may concern:*

Be it known that I, JAY H. SMITH, a citizen of the United States, residing at San Francisco, in the county of San Francisco and State of California, have invented a new and useful Retreading-Mold, of which the following is a specification.

This invention relates to molds for use in retreading tire casings and is designed for use in connection with tire vulcanizing apparatus of various types, for the purpose of putting new rubber on the treads of old, worn out casings.

One of the objects of the invention is to provide a mold the ends of which are kept cool so that the portions of the rubber adjacent the ends of the mold will not be affected by the heat.

Another object is to provide a mold which is simple and durable and the ends of which can be kept cool readily.

With the foregoing and other objects in view which will appear as the description proceeds, the invention consists of certain novel details of construction and combinations of parts which will be hereinafter more fully described and pointed out in the claim it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a side elevation of the mold.

Fig. 2 is a plan view thereof.

Fig. 3 is a section on line 3—3, Fig. 1.

Referring to the figures by characters of reference, 1 designates the body of the mold which is shaped to conform to the circumference and transverse contour of the tire, the active or mold face being provided with ribs or grooves to produce grooves or ribs on the tread of the tire corresponding with the ones already thereon. The wall of the mold is hollow and partitions are provided in the end portions thereof as shown at 2 thus to divide the interior of the wall into end or cooling compartments 3 and an intermediate or steam compartment 4. The end compartments 3 are connected by a supply pipe 5 opening into one side thereof and an outlet pipe 6 opening into the other side thereof. Water is directed into the supply pipe through a feed pipe 7 from any suitable source while a drain pipe 8 extends from the intermediate portion of the outlet pipe 6. A steam supply pipe 9 opens into the bottom of the chamber 4 at the center thereof. Suitably arranged lugs 10 may be formed on the mold to facilitate attaching it to a base, or the like.

In using the mold steam is directed into the compartment 4 and the mold then applied to the surface to be vulcanized. Cold water is directed into the compartments 3 from the pipe 5 and flows outwardly through the pipe 6, thus keeping the ends of the mold cool at all times.

What is claimed is:—

A mold for vulcanizing tires, etc., comprising a one piece member having a hollow wall constituting the mold body, said body being arcuate and having partitions in its walls adjacent the ends of the body and integral with the walls thereof, said partitions dividing the interior of the wall into end cooling compartments and an elongated intermediate heating compartment, a water feed pipe, branch pipes extending therefrom to the end compartments at one side, a water drain pipe, branch pipes extending therefrom and to the end compartments at the other side, a steam pipe opening into the intermediate compartment, and spaced attaching lugs depending from the intermediate portion of the mold.

In testimony that I claim the foregoing as my own, I have hereto affixed my signature in the presence of two witnesses.

JAY HARLEY SMITH.

Witnesses:
 JOHN H. CRABBE,
 W. T. ALLEN.